US009243215B2

(12) United States Patent
Dihora et al.

(10) Patent No.: US 9,243,215 B2
(45) Date of Patent: Jan. 26, 2016

(54) BENEFIT AGENT CONTAINING DELIVERY PARTICLE

(75) Inventors: Jiten Odhavji Dihora, Hamilton, OH (US); Ramanan Venkata Ganapathysundaram, Blue Ash, OH (US); Parshuram Gajanan Shukla, Pune (IN); Arun Savalaram Jadhav, Pune (IN)

(73) Assignee: The Procter & Gamble Company, Cincinnati, OH (US)

( * ) Notice: Subject to any disclaimer, the term of this patent is extended or adjusted under 35 U.S.C. 154(b) by 726 days.

(21) Appl. No.: 12/612,754

(22) Filed: Nov. 5, 2009

(65) Prior Publication Data
US 2010/0119679 A1 May 13, 2010

Related U.S. Application Data

(60) Provisional application No. 61/112,309, filed on Nov. 7, 2008.

(51) Int. Cl.
*B32B 9/00* (2006.01)
*C11D 3/50* (2006.01)
*B01J 13/16* (2006.01)
*C11D 3/37* (2006.01)
*C11D 3/43* (2006.01)
*C11D 17/00* (2006.01)

(52) U.S. Cl.
CPC ............... *C11D 3/505* (2013.01); *B01J 13/16* (2013.01); *C11D 3/373* (2013.01); *C11D 3/43* (2013.01); *C11D 17/0039* (2013.01); *Y10T 428/2989* (2015.01)

(58) Field of Classification Search
CPC ......... B01J 13/16; C11D 3/373; C11D 3/505; C11D 17/0039; C11D 3/43
USPC ............ 428/402–402.24; 427/213.3; 264/4.1; 512/1
See application file for complete search history.

(56) References Cited

U.S. PATENT DOCUMENTS

| | | | |
|---|---|---|---|
| 4,106,932 A * | 8/1978 | Blachford | 75/252 |
| 4,430,243 A | 2/1984 | Bragg | |
| 4,515,705 A | 5/1985 | Moeddel | |
| 4,537,706 A | 8/1985 | Severson, Jr. | |
| 4,537,707 A | 8/1985 | Severson, Jr. | |
| 4,550,862 A | 11/1985 | Barker et al. | |
| 4,561,998 A | 12/1985 | Wertz et al. | |
| 4,597,898 A | 7/1986 | Vander Meer | |
| 4,968,451 A | 11/1990 | Scheibel et al. | |
| 5,112,688 A | 5/1992 | Michael | |
| 5,225,118 A | 7/1993 | Juang et al. | |
| 5,300,305 A | 4/1994 | Stapler et al. | |
| 5,486,303 A | 1/1996 | Capeci et al. | |
| 5,489,392 A | 2/1996 | Capeci et al. | |
| 5,516,448 A | 5/1996 | Capeci et al. | |
| 5,565,145 A | 10/1996 | Watson et al. | |
| 5,565,422 A | 10/1996 | Del Greco et al. | |
| 5,569,645 A | 10/1996 | Dinniwell et al. | |
| 5,574,005 A | 11/1996 | Welch et al. | |
| 5,574,179 A | 11/1996 | Wahl et al. | |
| 5,576,282 A | 11/1996 | Miracle et al. | |
| 5,595,967 A | 1/1997 | Miracle et al. | |
| 5,597,936 A | 1/1997 | Perkins et al. | |
| 5,691,297 A | 11/1997 | Nassano et al. | |
| 5,879,584 A | 3/1999 | Bianchetti et al. | |
| 5,929,022 A | 7/1999 | Velazquez | |
| 6,020,066 A | 2/2000 | Weisser et al. | |
| 6,225,464 B1 | 5/2001 | Hiler, II et al. | |
| 6,294,514 B1 | 9/2001 | Welling | |
| 6,306,812 B1 | 10/2001 | Perkins et al. | |
| 6,326,348 B1 | 12/2001 | Vinson et al. | |
| 6,376,445 B1 | 4/2002 | Bettiol et al. | |
| 6,485,736 B1 | 11/2002 | Shirley et al. | |
| 6,544,926 B1 | 4/2003 | Bodmer et al. | |
| 6,548,467 B2 | 4/2003 | Baker et al. | |
| 6,592,990 B2 | 7/2003 | Schwantes | |
| 6,869,923 B1 | 3/2005 | Cunningham et al. | |
| 6,984,617 B2 | 1/2006 | Holland et al. | |
| 6,992,047 B2 * | 1/2006 | Asrar et al. | 504/359 |
| 7,208,462 B2 | 4/2007 | Heltovics et al. | |
| 7,208,463 B2 | 4/2007 | Heltovics et al. | |
| 7,208,464 B2 | 4/2007 | Heltovics et al. | |

(Continued)

FOREIGN PATENT DOCUMENTS

| | | |
|---|---|---|
| EP | 1 881 059 A1 | 1/2008 |
| WO | WO 00/32601 A2 | 6/2000 |
| WO | WO 2007/135636 A | 11/2007 |

OTHER PUBLICATIONS http://en.wikipedia.org/wiki/Hansen_solubility_parameter Retrieved Jul. 2, 2012.*
Leo, Albert J., Methods of Calculating Partition Coefficients, Comp. Medicinal Chemistry, 1990, p. 295, vol. 4.
ASTM Designation—D 2887-04a, Standard Test Method for Boiling Range Distribution of Petroleum Fractions by Gas Chromatography, ASTM International.
Sun, G., et al., Mechanical properties of melamine-formaldehyde microcapsules, J. Microencapsulation, 2001, pp. 593-602, vol. 18, No. 5.

(Continued)

*Primary Examiner* — Nathan M Nutter
(74) *Attorney, Agent, or Firm* — Jason J Camp; James F McBride

(57) ABSTRACT

The present invention relates to benefit agent containing delivery particles, compositions comprising said particles, and processes for making and using the aforementioned particles and compositions. When employed in compositions, for example, cleaning or fabric care compositions, such particles increase the efficiency of benefit agent delivery, there by allowing reduced amounts of benefit agents to be employed. In addition to allowing the amount of benefit agent to be reduced, such particles allow a broad range of benefit agents to be employed.

19 Claims, No Drawings

(56) References Cited

U.S. PATENT DOCUMENTS

| | | |
|---|---|---|
| 7,407,650 B2 | 8/2008 | Heltovics et al. |
| 7,413,731 B2 | 8/2008 | Heltovics et al. |
| 7,659,239 B2 | 2/2010 | King et al. |
| 8,460,792 B2 | 6/2013 | Smets et al. |
| 2003/0215417 A1 | 11/2003 | Uchiyama et al. |
| 2004/0137031 A1* | 7/2004 | Seitz et al. .................. 424/408 |
| 2006/0005333 A1 | 1/2006 | Catalfamo et al. |
| 2006/0243322 A1 | 11/2006 | Heltovics et al. |
| 2006/0252667 A1 | 11/2006 | Mort et al. |
| 2006/0258768 A1 | 11/2006 | Uchiyama et al. |
| 2006/0276356 A1 | 12/2006 | Panandiker et al. |
| 2007/0042182 A1* | 2/2007 | Markus et al. ............. 428/402.2 |
| 2007/0082829 A1 | 4/2007 | Smets et al. |
| 2007/0138672 A1 | 6/2007 | Lee et al. |
| 2007/0138673 A1 | 6/2007 | Lee et al. |
| 2007/0149424 A1 | 6/2007 | Warr et al. |
| 2007/0191256 A1 | 8/2007 | Fossum et al. |
| 2007/0202063 A1 | 8/2007 | Dihora et al. |
| 2007/0259170 A1 | 11/2007 | Brown et al. |
| 2007/0275870 A1 | 11/2007 | King et al. |
| 2008/0031961 A1 | 2/2008 | Cunningham et al. |
| 2008/0118568 A1 | 5/2008 | Smets et al. |
| 2008/0176780 A1 | 7/2008 | Warr et al. |
| 2008/0187596 A1 | 8/2008 | Dihora et al. |
| 2008/0227675 A1 | 9/2008 | Struillou et al. |
| 2008/0242548 A1 | 10/2008 | Asrar et al. |
| 2008/0305982 A1 | 12/2008 | Smets et al. |
| 2009/0209661 A1 | 8/2009 | Somerville Roberts et al. |
| 2010/0086575 A1 | 4/2010 | Dihora et al. |
| 2011/0015115 A1 | 1/2011 | Smets et al. |
| 2012/0052027 A9 | 3/2012 | Dihora et al. |

OTHER PUBLICATIONS

International Search Report, International Application No. PCT/US2009/063205, mailed Mar. 15, 2010, 4 pages.

International Search Report PCT/US2009/063205 including the Written Opinion of the International Searching Authority mailed Mar. 15, 2010, 11 pages.

\* cited by examiner

BENEFIT AGENT CONTAINING DELIVERY PARTICLE

CROSS-REFERENCES TO RELATED APPLICATIONS

This application claims priority under 35 U.S.C. §119(e) to U.S. Provisional Application Ser. No. 61/112,309 filed Nov. 7, 2008.

FIELD OF INVENTION

The present application relates to benefit agent containing delivery particles, compositions comprising such particles, and processes for making and using such particles and compositions.

BACKGROUND OF THE INVENTION

Benefit agents, such as perfumes, silicones, waxes, flavors, vitamins and fabric softening agents, are expensive and/or generally less effective when employed at high levels in consumer products, for example, personal care compositions, cleaning compositions, and fabric care compositions. As a result, there is a desire to maximize the effectiveness of such benefit agents. One method of achieving such objective is to improve the delivery efficiencies of such benefit agents. Unfortunately, it is difficult to improve the delivery efficiencies of benefit agents as such agents may be lost do to the agents' physical or chemical characteristics, or such agents may be incompatible with other compositional components or the situs that is treated.

As result, the industry turned to microcapsules manufactured by an interfacial polymerization process comprising the formation of a shell at an oil/water interface. Generally, such processes require that a first shell forming material be dissolved in a core material. Upon adding a second shell forming material, the first and second materials react to form a shell that encapsulates the core material. The resulting shell is typically immiscible in the oil and water phases.

Unfortunately, the choice of a shell for a particular core material is not readily apparent. For example, if the core material and shell are compatible, the core material may act as a plasticizer, and thus increase diffusion of the core material through the shell. If the shell and the core material are incompatible, the encapsulation efficiency may be poor.

Accordingly, there is a need for a process of identifying suitable shell and cores for a benefit agent delivery particle and benefit agent containing delivery particles that provide the required improved benefit agent delivery efficiency.

SUMMARY OF THE INVENTION

The present invention relates to benefit agent containing delivery particles comprising a core material and a wall material that encapsulates the core material. The present invention also relates to compositions comprising said particles, and processes for making and using such particles and compositions.

DETAILED DESCRIPTION OF THE INVENTION

Definitions

As used herein "consumer product" means baby care, beauty care, fabric & home care, family care, feminine care, health care, snack and/or beverage products or devices intended to be used or consumed in the form in which it is sold, and not intended for subsequent commercial manufacture or modification. Such products include but are not limited to diapers, bibs, wipes; products for and/or methods relating to treating hair (human, dog, and/or cat), including, bleaching, coloring, dyeing, conditioning, shampooing, styling; deodorants and antiperspirants; personal cleansing; cosmetics; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; tampons, feminine napkins; products and/or methods relating to oral care including toothpastes, tooth gels, tooth rinses, denture adhesives, tooth whitening; over-the-counter health care including cough and cold remedies, pain relievers, RX pharmaceuticals, pet health and nutrition, and water purification; processed food products intended primarily for consumption between customary meals or as a meal accompaniment (non-limiting examples include potato chips, tortilla chips, popcorn, pretzels, corn chips, cereal bars, vegetable chips or crisps, snack mixes, party mixes, multigrain chips, snack crackers, cheese snacks, pork rinds, corn snacks, pellet snacks, extruded snacks and bagel chips); and coffee.

As used herein, the term "cleaning composition" includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including the various tablet, granular, liquid and rinse-aid types for household and institutional use; liquid cleaning and disinfecting agents, including antibacterial hand-wash types, cleaning bars, mouthwashes, denture cleaners, dentifrice, car or carpet shampoos, bathroom cleaners; hair shampoos and hair-rinses; shower gels and foam baths and metal cleaners; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists.

As used herein, the term "fabric care composition" includes, unless otherwise indicated, fabric softening compositions, fabric enhancing compositions, fabric freshening compositions and combinations there of.

As used herein, the phrase "benefit agent containing delivery particle" encompasses microcapsules including perfume microcapsules.

As used herein, the terms "particle", "benefit agent containing delivery particle", "capsule" and "microcapsule" are synonymous.

As used herein, the articles including "a" and "an" when used in a claim, are understood to mean one or more of what is claimed or described.

As used herein, the terms "include", "includes" and "including" are meant to be non-limiting.

The test methods disclosed in the Test Methods Section of the present application should be used to determine the respective values of the parameters of Applicants' inventions.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Benefit Agent Delivery Particle

Applicants have developed a means to maximize encapsulation efficiency, and produce capsules having minimal leakage through the capsule walls' when the capsule is exposed to liquid product formulations, and a desired fracture profile.

Applicants recognized that solubility parameter optimization is an important factor along with capsule shell thickness. Increasing the capsules' shell thickness minimizes core materials leakage from the capsules. However, the means to increase the capsules' shell thickness is not readily apparent. Applicants found that the capsules' shell thickness is directly proportional to the conversion of the first and second shell forming materials during the capsule shell making process and that such conversion of the first and second shell forming materials is dependent on the solubility parameter difference between the core material and the resulting shell material. Thus, if the a capsule's core and shell materials have the proper solubility parameter difference, maximum encapsulation efficiency is achieved, and capsules having minimal leakage through the capsule walls, when the capsule is exposed to liquid product formulations, and a desired fracture profile can be produced. Suitable solubility parameter differences between the core material and the capsule wall material are from about 1 to about 20, or from about 2 to about 10, or even from about 3 to about 6.

Applicants disclose capsules comprising a core material and a shell material, where in in one aspect said shell material encapsulates said core material, (i.e. in one aspect at least partially surrounds said core material or in another aspect surrounds said core material). Such core material and such shell material may have the aforementioned solubility parameter difference.

In one aspect, at least 75%, 85% or even 90% of said benefit agent delivery particles may have a particle size of from about 1 microns to about 80 microns, about 5 microns to 60 microns, from about 10 microns to about 50 microns, or even from about 15 microns to about 40 microns.

In one aspect, at least 75%, 85% or even 90% of said benefit agent delivery particle may have a core content, based on the total composition of the benefit agent delivery particle, from about 1% to 99%, from about 20% to 85%, from about 30% to 60%, from about 40% to 55%.

In one aspect, benefit agent delivery particles comprising a core material and a shell, said shell at least partially surrounding said core material, is disclosed. As tested in accordance with Applicants test methods, at least 75%, 85% or even 90% of said benefit agent delivery particles have a fracture strength of from about 0.2 MPa to about 10 MPa, from about 0.4 MPa to about 5 MPa, from about 0.6 MPa to about 3.5 MPa, or even from about 0.7 MPa to about 3 MPa; and a benefit agent leakage of from 0% to about 30%, from 0% to about 20%, or even from 0% to about 5%.

In one aspect, said benefit agent delivery particles' core material may comprise a material selected from the group consisting of Table 1 Materials below:

TABLE 1

| Chemical Name | Computed LogP | Hansen Solubility Parameter - $\delta_t$ $(MPa^{1/2})$ |
|---|---|---|
| 2-Ethyl-3-hydroxy-4-pyrone; | 0.29 | 21.50 |
| Acetic acid ethyl ester | 0.39 | 18.44 |
| 1-Ethoxybutane-1,3-dione | 0.47 | 20.07 |
| 2-Methoxy-4-formylphenol | 1 | 24.72 |
| 1,3-Benzodioxole-5-carboxaldehyde | 1.12 | 31.01 |
| (Z)-3-Hexenol | 1.22 | 22.27 |
| benzaldehyde; | 1.37 | 21.59 |
| 4-Methoxy-benzaldehyde; | 1.37 | 22.53 |
| Phenylacetic aldehyde | 1.37 | 21.18 |
| 3-methyl-2-butenyl acetate | 1.44 | 17.51 |
| 2-Phenylethyl alcohol | 1.44 | 23.61 |
| Benzaldehyde, 3-ethoxy-4-hydroxy- | 1.51 | 24.40 |
| 2H-1-Benzopyran-2-one | 1.56 | 25.56 |
| 1-Phenylethanone | 1.57 | 20.74 |
| Methyl 2-aminobenzoate | 1.6 | 24.92 |
| Hydroxycitronellal: | 1.68 | 19.29 |
| Phenylmethyl acetate | 1.68 | 20.28 |
| Isopropyl isobutyrate | 1.69 | 17.21 |
| Methyl benzoate | 1.72 | 20.83 |
| Cyclooct-4-en-1-yl methyl carbonate | 1.73 | 20.92 |
| 2-Methyl-3-(3,4-methylenedioxyphenyl)-propanal | 1.73 | 29.01 |
| Trans-2 Hexenal | 1.74 | 18.92 |
| Cyclopentylideneacetic acid, methyl ester | 1.75 | 22.66 |
| 2-Propen-1-ol, 3-phenyl- | 1.78 | 23.47 |
| 4-Methoxybenzyl acetate | 1.81 | 20.61 |
| cis-3-Hexenyl methyl carbonate | 1.92 | 17.54 |
| 3-Methoxy-4-isobutyrylbenzaldehyde | 1.96 | 22.70 |
| Ethyl 2-methyl butyrate; | 2 | 17.30 |
| Methyl 2-hydroxybenzoate | 2.09 | 23.68 |
| cis-3-Hexenyl acetate | 2.1 | 17.66 |

TABLE 1-continued

| Chemical Name | Computed LogP | Hansen Solubility Parameter - $\delta_t$ (MPa$^{1/2}$) |
|---|---|---|
| 2-methoxy-4-(2-propenyl)-; | 2.11 | 23.08 |
| Benzyl acetone | 2.14 | 19.93 |
| 1-Methyl-4-isopropyl-1-cyclohexen-8-ol | 2.16 | 20.45 |
| 2,3-Benzopyrrole | 2.18 | 23.29 |
| 1,6-Octadien-3-ol, 3,7-dimethyl- | 2.33 | 19.35 |
| trans-3-Phenyl-2-propenenitrile | 2.34 | 21.86 |
| endo-1,7,7-Trimethylbicyclo[2.2.1]heptan-2-ol | 2.37 | 21.19 |
| 2-Cyclohexen-1-one, 2-methyl-5-(1-methylethenyl)-, (5R)- | 2.39 | 19.33 |
| Isoamyloxyacetic acid, allyl ester | 2.4 | 17.33 |
| Isopropyl 2-methyl butyrate | 2.42 | 17.12 |
| 2(3H)-Furanone, dihydro-5-pentyl- | 2.46 | 22.52 |
| cis-3,7-Dimethyl-2,6-octadien-1-ol | 2.46 | 20.14 |
| Acetic acid, (cyclohexyloxy)-, 2-propenyl ester | 2.48 | 18.87 |
| 2,6-Dimethyl-7-octen-2-ol | 2.48 | 19.25 |
| 2,6-Dimethyl-5-heptenal | 2.53 | 17.60 |
| 2-Propenyl hexanoate | 2.57 | 17.33 |
| Cyclohexanol\ | 2.59 | 20.54 |
| 1-Hydroxy-2-methoxy-4-(1-propenyl)benzene | 2.63 | 22.97 |
| 1-Hexyl acetate | 2.65 | 17.51 |
| (±)-3,7-Dimethyloct-6-en-1-ol | 2.7 | 19.90 |
| Ethyl 3-methyl-3-phenylglycidate | 2.73 | 23.59 |
| Phenol, 2-methoxy-4-(1-propenyl)-, acetate | 2.75 | 20.25 |
| trans-2,cis-6-Nonadienal | 2.8 | 18.07 |
| 1,3-Oxathiane, 2-methyl-4-propyl-, (2R,4S)-rel- | 2.86 | 19.97 |
| 3,7-Dimethyl-1,6-nonadien-3-ol | 2.87 | 19.24 |
| Phenol, 2-ethoxy-5-(1-propen-1-yl)-; | 2.9 | 22.66 |
| Oxacyclododecan-2-one | 2.94 | 22.09 |
| 3,7-Dimethyl-6-octenal | 2.98 | 17.46 |
| 4-Methyl-3-decen-5-ol | 2.98 | 18.91 |
| Citral | 3 | 17.57 |
| 3,7-Dimethyl-6-octen-1-ol formate | 3.02 | 16.75 |
| Bicyclo[2.2.1]heptan-2-ol, 1,7,7-trimethyl-, acetate, (1R,2R,4R)-rel- | 3.03 | 20.29 |
| 2-Methoxy-4-propylphenol | 3.03 | 22.70 |
| 2-Propenyl heptanoate | 3.07 | 17.16 |
| 2-Oxabicyclo[2.2.2]octane, 1,3,3-trimethyl- | 3.12 | 18.35 |
| 1-Methyl-4-(1-methylvinyl)cyclohexyl acetate | 3.18 | 18.57 |
| Dimethylbenzylcarbinyl acetate | 3.18 | 19.18 |
| 2H-1,5-Benzodioxepin-3(4H)-one, 7-(3-methylbutyl)- | 3.2 | 25.38 |
| 2H-Pyran-2-one, tetrahydro-6-pentyl-; | 3.22 | 19.62 |
| 4-Propenylanisole | 3.22 | 19.52 |
| 3-Methyl-2-(2-cis-pentenyl)-2-cyclopenten-1-one | 3.29 | 19.97 |
| Diphenyl ketone | 3.36 | 22.15 |
| n-Nonanal | 3.36 | 17.64 |
| Ethyl 3-(1-methylethyl)-bicyclo[2.2.1]hept-5-ene-2-carboxylate | 3.38 | 21.63 |
| 1,6-Methanonaphthalen-1(2H)-ol, octahydro-4,8a,9,9-tetramethyl-, 1R,4S,4aS,6R,8aS)- | 3.39 | 18.00 |
| 2,4-Cyclohexadiene-1-carboxylic acid, 2,6,6-trimethyl-, ethyl ester | 3.43 | 18.17 |
| 3,7-Dimethyl-6-octenonitrile | 3.44 | 19.58 |
| Hexyl 2-methylpropanoate | 3.45 | 16.88 |
| 2H-Pyran, tetrahydro-4-methyl-2-(2-methyl-1-propenyl)- | 3.48 | 18.06 |
| 10-Undecanal | 3.5 | 15.64 | and/or optionally a material selected from the group consisting of vegetable oil, including neat and/or blended vegetable oils including caster oil, coconut oil, cottonseed oil, grape oil, rapeseed, soybean oil, corn oil, palm oil, linseed oil, safflower oil, olive oil, peanut oil, coconut oil, palm kernel oil, castor oil, lemon oil and mixtures thereof; esters of vegetable oils, esters, including dibutyl adipate, dibutyl phthalate, butyl benzyl adipate, benzyl octyl adipate, tricresyl phosphate, trioctyl phosphate and mixtures thereof; straight or branched chain hydrocarbons, including those straight or branched chain hydrocarbons having a boiling point of greater than about 80° C.; partially hydrogenated terphenyls, dialkyl phthalates, alkyl biphenyls, including monoisopropylbiphenyl, alkylated naphthalene, including dipropylnaphthalene, petroleum spirits, including kerosene, mineral oil and mixtures thereof; aromatic solvents, including benzene, toluene and mixtures thereof; silicone oils; and mixtures there of.

In one aspect, said benefit agent delivery particles' wall material may comprise a suitable resin including the reaction product of polycondensation, such as polyamides, polycarbonates, polyesters, polyurethane, polyurea and mixtures thereof. In one aspect, said benefit agent delivery particles' wall material may comprise a polyurethane-polyurea. Suitable materials for making may be obtained from one or more of the following companies Solutia Inc. (St Louis, Mo. U.S.A.), Cytec Industries (West Paterson, N.J. U.S.A.), Sigma-Aldrich (St. Louis, Mo. U.S.A.).

In one aspect, said benefit agent delivery particles may be spray dried said benefit agent delivery particles.

In one aspect, said benefit agent delivery particles may have any combination of the aforementioned parameters as listed in the aforementioned aspects.

Suitable materials for making may be supplied from one or more of the following companies Firmenich (Geneva, Switzerland), Givaudan (Argenteuil, France), IFF (Hazlet, N.J., U.S.A), Quest (Mount Olive, N.J., U.S.A.), Bedoukian (Danbury, Conn., U.S.A.), Sigma Aldrich (St. Louis, Mo., U.S.A.), Millennium Specialty Chemicals (Olympia Fields, Ill., U.S.A.), Polarone International (Jersey City, N.J., U.S.A.), Fragrance Resources (Keyport, N.J., U.S.A.), and Aroma & Flavor Specialties (Danbury, Conn., U.S.A.).

Process of Making Benefit Agent Containing Delivery Particles

In one aspect, a process comprising:

a.) Preparing an organic phase comprising a core material and a first shell forming material.

b.) Optionally, preparing a prepolymer phase comprising a reaction product of polyisocyanate, polyol, and a diol containing pendant carboxylic groups. The molar ratio of polyisocyanate:polyol:diol containing pendant carboxylic group can be from about 10 parts:2 parts:1 part, from about 6 parts:2 parts:1 part, from about 4 parts:2 parts:1 part. The prepolymer phase is typically added to the core material to form an organic phase.

c.) Preparing an aqueous phase comprising water, and optionally a catalyst and/or a surfactant.

d.) Dispersing the organic phase into said aqueous phase, with the weight ratio of organic phase:aqueous phase being from about 0.1 to 20, from about 1 to 10, from about 1 to 5.

e.) Adding a second shell forming material (neat or diluted with water and optionally, a surfactant), dropwise, at an addition rate from about 0.05 to 5, from about 0.1 to 3, from about 0.2 to 1 grams per minute. The molar ratio of second shell forming material:first shell forming material may be from about 2 to 1, from about 1.5 to 1, from about 1.2 to 1, from about 1.1 to 1.

f.) Allowing the dispersion to react for from about 1 to about 24, from about 2 to 18, from about 4 to 12, from about 5 to 8 hours during which time capsules having the previously disclosed core and shell are produced. The reaction temperature of the dispersion is generally held at from about 10 to 110, from about 20 to 80, from about 40 to 60 degrees Centigrade.

g.) Optionally, centrifuging the aqueous dispersion of capsules, followed by washing in order to purify the capsules.

h.) Optionally, combining any scavenger material, structurant, and/or anti-agglomeration agent with said second composition during step f.) or thereafter—such materials may be combined in any order but in one aspect the scavenger material is combined first, any structurant second, and then anti-agglomeration agent is combined; and i.) Optionally, spray drying said second composition.

is disclosed.

In one or more aspects of the process, said core material may comprise a perfume raw material, for example, any perfume raw material disclosed in the present specification.

Suitable First Shell Forming Material

In one or more aspects of the process, said first shell forming material may comprise aromatic polyisocyanates, aliphatic polyisocyanates, and mixtures thereof. Aromatic polyiscocyanates comprise, but are not limited to, 2,4- and 2,6-toluene diisocyanate, naphthalene diisocyanate, diphenyl methane diisocyanate and triphenyl methane-p,p'p"-trityl triisocyanate, polymethylene polyphenylene isocyanate, 2,4,4'-diphenylether triisocyanate, 3,3'-dimethyl-4,4'-diphenyl diisocyanate, 3,3'-dimethoxy-4,4'diphenyl diisocyanate, and 4,4'4"-triphenylmethane triisocyanate Aliphatic polyisocyanates comprise, but are not limited to Dicyclohexylmethane 4,4'-diisocyanate, hexamethylene1,6-diisocyanate, isophorone diisocyanate, trimethyl-hexamethylene diisocyanate, trimer of hexamethylene1,6-diisocyanate, trimer of isophorone diisocyanate, 1,4-cyclohexane diisocyanate, urea of hexamethylene diisocyanate, trimethylene diisocyanate, propylene-1,2-diisocyanate and butylene1,2-diisocyanate and mixtures thereof.

Suitable Second Shell Forming Material

In one or more aspects of the process, the second shell forming material may comprise, but is not limited to, polyamines such as ethylene diamine (EDA), phenylene diamine, toluene diamine, hexamethylene diamine, diethylenetriamine, tetraethylene pentaamine, pentamethylene hexamine, 1,6-hexamethylene diamine, triethylene tetramine, 2,4-diamino-6-methyl-1,3,5 triazine 1,2-diaminocyclohexane, 4,4'-diaminodiphenylmethane, 1,5-diaminonaphthalene, 2,4,4'-triaminodiphenylether, bis(hexamethylenetriamine), 1,4,5,8-tetraminoanthraquinone, isophorone diamine, diamino propane and diaminobutane, and mixtures thereof.

Suitable Emulsifiers

In one or more aspects of the process, said emulsifier may comprise a moiety selected from the group consisting of carboxy, hydroxyl, thiol, amine, amide and combinations thereof. In one aspect, emulsifiers may comprise, but are not limited to, non-ionic surfactants such as polyvinylpyrrolidone (PVP), polyethylene glycol sorbitan monolaurate (tween 20), polyethylene glycol sorbitan monopalmitate (tween 40), polyethylene glycol sorbitan monooleate (tween 80), polyvinyl alcohol, (PVA), and poly(ethoxy)nonyl phenol, ethylene maleic anhydride (EMA) copolymer, Easy-Sperse (from ISP Technologies Inc.), ionic surfactants such as partially neutralized salts of polyacrylic acids such as sodium or potassium polyacrylate or sodium or potassium polymethacrylate. Brij-35, hypermer A 60, or sodium lignosulphate, and mixtures thereof. Emulsifiers may also include, but are not limited to, acrylic acid-alkyl acrylate copolymer, poly (acrylic acid), polyoxyalkylene sorbitan fatty esters, polyalkylene co-carboxy anhydrides, polyalkylene co-maleic anhydrides, poly(methyl vinyl ether-co-maleic anhydride), poly(propylene-co-maleic anhydride), poly(butadiene co-maleic anhydride), and poly(vinyl acetate-co-maleic anhydride), polyvinyl alcohols, polyalkylene glycols, polyoxyalkylene glycols, and mixtures thereof.

Catalyst

In one or more aspects of the process, said catalyst may comprise amino or organometalic compounds such as N,N'-dimethylaminoethanol, N,N'-dimethylcyclohexylamine, bis-(2-dimethylaminoethyl)ether, N,N'-dimethylacetylamine, diaminobicyclooctane, stannous octoate and dibutyltindilaurate, and mixtures thereof.

Crosslinkers

In one or more aspects of the process, said crosslinker contains more than two amine functionalities such as tetraethylene pentamine, triethylene tetraamine, 2,4,4'-triaminodiphenylether, bis(hexamethylene triamine), 1,4,5,8-tetramino anthraquinone and diethylene triamine (DETA), and mixtures thereof.

Polyols

In one or more aspects of the process, polyols can comprise, but are not limited to, low molecular weight polymers such as ethylene glycol, diethylene glycol, propylene glycol, 1,4-butanediol, 1,6-hexanediol, dipropylene glycol, cyclohexyl1,4-dimethanol, 1,8-octanediol; high molecular weight polyols such as polyethylene glycol, polypropylene glycols, polytetramethylene glycols (PTMG) having average molecular weight in the range of 200 to 2000, polyester diols, diols containing carboxyl groups such as dimethylol propionic acid (DMPA) and dimethylol butanoic acid (DMBA) and mixtures thereof.

In one or more aspects of the process, any of the aforementioned processing parameters may be combined.

In one aspect of the process, Applicants have found that the claimed process can encapsulate and minimize the premature loss of a greater fraction of perfume raw materials that have a ClogP <2 than disclosed in the relevant art. Moreover, the present invention eliminates the regulatory challenges that exist with aminoplast capsules (e.g. formaldehyde). The residual isocyanate measured in the microcapsules of the present invention is non-detectable (using the standard dibutyl amine titration method for isocyanate determination and by IR spectroscopy—

The solubility parameter ($\delta$) is a numerical value which indicates the relative solvency behavior of a specific material. It is derived from cohesive energy density of the material, which in turn is derived from heat of vaporization. For a polymer, $\delta$ is usually taken to be the value of the solubility parameter of the material producing the solution with maximum intrinsic viscosity or maximum swelling of a network of the polymer.

Two substances can be miscible (or compatible) with each other if the difference between their solubility parameters is minimal. In one aspect, the two materials of concern can be the capsule shell material and the perfume core material. There are two extremes: 1) If the shell material and the core material are compatible (i.e. their $\delta$ values are close), the core material can act as a plasticizer for the shell material, which can result in poor encapsulation efficiency and/or loss of the core material when the resulting formed microcapsules are stored in a product such as a liquid product. 2) If the shell material and the core material are totally incompatible (i.e. their $\delta$ values are significantly different), the core material has very poor solvency for the shell polymer. In this case, the initial shell polymer film formed during interfacial polymerization will be very dense, which can restrict diffusion of the second shell forming material through this dense polymer shell material. This subsequently can result in poor polymer conversion and thus microcapsules with a very thin shell. Thus, there is an optimum difference between solubility parameters of core and shell material.

Applicants recognized that the proper choice of a shell material having an optimum solubility parameter difference from the core material, results in improved encapsulation efficiency. Encapsulation efficiency is determined by polymer conversion and is indicated by solid content recovery (SCR) from the aqueous dispersion of microcapsules. Solubility parameter of polyurea prepared with aromatic isocyanate can be lowered by replacing aromatic isocyanate with aliphatic isocyanate. Solubility parameter of aromatic polyurea prepared with 4,4'-methylene diphenylene diisocyanate (MDI) and ethylene diamine (EDA) is reported to be ~25 $MPa^{1/2}$. Most of the perfume raw materials have solubility parameter typically less than 25 $MPa^{1/2}$. Solubility parameters of low molecular weight substances and polymers are well documented.

Useful structurant materials that may be added to adequately suspend the benefit agent containing delivery particles include polysaccharides, for example, gellan gum, waxy maize or dent corn starch, octenyl succinated starches, derivatized starches such as hydroxyethylated or hydroxypropylated starches, carrageenan, guar gum, pectin, xanthan gum, and mixtures thereof; modified celluloses such as hydrolyzed cellulose acetate, hydroxy propyl cellulose, methyl cellulose, and mixtures thereof; modified proteins such as gelatin; hydrogenated and non-hydrogenated polyalkenes, and mixtures thereof; inorganic salts, for example, magnesium chloride, calcium chloride, calcium formate, magnesium formate, aluminum chloride, potassium permanganate, laponite clay, bentonite clay and mixtures thereof; polysaccharides in combination with inorganic salts; quaternized polymeric materials, for example, polyether amines, alkyl trimethyl ammonium chlorides, diester ditallow ammonium chloride; imidazoles; nonionic polymers with a pKa less than 6.0, for example polyethyleneimine, polyethyleneimine ethoxylate; polyurethanes. Such materials can be obtained from CP Kelco Corp. of San Diego, Calif., USA; Degussa AG or Dusseldorf, Germany; BASF AG of Ludwigshafen, Germany; Rhodia Corp. of Cranbury, N.J., USA; Baker Hughes Corp. of Houston, Tex., USA; Hercules Corp. of Wilmington, Del., USA; Agrium Inc. of Calgary, Alberta, Canada, ISP of New Jersey, U.S.A.

Useful anti-agglomeration agent materials include, divalent salts such as magnesium salts, for example, magnesium chloride, magnesium acetate, magnesium phosphate, magnesium formate, magnesium boride, magnesium titanate, magnesium sulfate heptahydrate; calcium salts, for example, calcium chloride, calcium formate, calcium acetate, calcium bromide; trivalent salts, such as aluminum salts, for example, aluminum sulfate, aluminum phosphate, aluminum chloride hydrate and polymers that have the ability to suspend anionic particles such as suspension polymers, for example, polyethylene imines, alkoxylated polyethylene imines, polyquaternium-6 and polyquaternium-7.

In one aspect of the invention, benefit agent containing delivery particles are manufactured and are subsequently coated with a material to reduce the rate of leakage of the benefit agent from the particles when the particles are subjected to a bulk environment containing, for example, surfactants, polymers, and solvents. Non-limiting examples of coating materials that can serve as barrier materials include materials selected from the group consisting of pyrrolidone polymers, such as polyvinyl pyrrolidone homopolymer, and its various copolymers with styrene, vinyl acetate, imidazoles, primary and secondary amine containing monomers, polyethyleneimines, including ethoxylated polyethyeleimines, methyl acrylate, polyvinyl acetal; maleic anhydride; polyvinyl alcohol homopolymer, and its various copolymers with vinyl acetate, 2-acrylamide-2-methylpropane sulfonate, primary and secondary amine containing monomers, methyl acrylate; polyacrylamides; polyacrylic acids; polyethyleneimines, ethoxylated polyethyleneimines; microcrystalline waxes; paraffin waxes; modified polysaccharides such as waxy maize or dent corn starch, octenyl succinated starches, derivatized starches such as hydroxyethylated or hydroxypropylated starches, carrageenan, guar gum, pectin, xanthan gum; modified celluloses such as hydrolyzed cellulose acetate, hydroxy propyl cellulose, methyl cellulose, and the like; modified proteins such as gelatin; hydrogenated and non-hydrogenated polyalkenes; fatty acids; hardened shells such as urea crosslinked with formaldehyde, gelatin-polyphosphate, melamine-formaldehyde, polyvinyl alcohol cross-linked with sodium tetraborate or gluteraldehyde; latexes of styrene-butadiene, ethyl cellulose, inorganic materials such as clays including magnesium silicates, aluminosilicates; sodium silicates, and the like; and mixtures thereof. Such materials can be obtained from CP Kelco Corp. of San Diego, Calif., USA; Degussa AG or Dusseldorf, Germany; BASF AG of Ludwigshafen, Germany; Rhodia Corp. of Cranbury, N.J., USA; Baker Hughes Corp. of Houston, Tex., USA; Hercules Corp. of Wilmington, Del., USA; Agrium Inc. of Calgary, Alberta, Canada, ISP of New Jersey U.S.A. In one aspect, for example, wherein the particle is employed in a fabric conditioning composition, the coating material comprises sodium silicate. While not being bound by theory, it is believed that sodium silicate's solubility at high pH, but poor solubility at low pH makes it an ideal material for use on particles that may be used in compositions that are formulated at pH below 7 but used in an environment wherein the pH is greater or equal to 7. However, the coating aspect of the present invention is not limited to the benefit agent containing delivery particles of the present invention as any benefit agent containing delivery particle may benefit from the coatings and coating processes disclosed herein.

Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders. Such equipment can be obtained from Lodige GmbH (Paderborn, Germany), Littleford Day, Inc. (Florence, Ky., U.S.A.), Forberg AS (Larvik, Norway), Glatt Ingenieurtechnik GmbH (Weimar, Germany), Niro (Soeborg, Denmark), Hosokawa Bepex Corp. (Minneapolis, Minn., U.S.A.), Arde Barinco (N.J., U.S.A.).

Compositions Comprising Benefit Agent Containing Delivery Particles

Applicants' compositions may comprise any embodiment of the particle disclosed in the present application—including any embodiment produced by the benefit agent delivery making process detailed in the present specification. In one aspect, said composition is a consumer product. While the precise level of particle that is employed depends on the type and end use of the composition, a composition may comprise from about 0.01 to about 10, from about 0.1 to about 10, or even from about 0.2 to about 5 weight % of said particle based on total composition weight. In one aspect, a consumer product comprising from about 0.001% to about 25%, from about 0.001% to about 10%, or from about 0.01% to about 3%, based on total consumer product mass weight, of the aforementioned benefit agent delivery particles is disclosed.

In one aspect, a cleaning composition comprising from about 0.005% to about 10%, from about 0.01% to about 3%, or from about 0.1% to about 1% based on total cleaning composition mass weight of the aforementioned benefit agent delivery particles is disclosed.

In one aspect, a fabric care composition comprising from about 0.005% to about 10%, from about 0.01% to about 3%, or from about 0.1% to about 1% based on total fabric care mass weight of the aforementioned benefit agent delivery particle composition is disclosed.

In one aspect, when the aforementioned particle composition is employed in a consumer product, for example a liquid consumer product, the particle composition may have a deposition of at least 10%, 20%, 30%, 40%, 50%, 60%, 70%, 80%, 90%, or even 100%.

In one aspect, when the aforementioned particle composition is employed in a consumer product, for example a liquid consumer product, the particle composition may have less than 50%, 40%, 30%, 20%, 10% or even 0% leakage of the encapsulated benefit agent from the microcapsules of said particle composition into said consumer product.

In one aspect, a cleaning composition may comprise, from about 0.1 to about 1 weight % of such particle based on total cleaning composition weight of such particle. In one aspect, a fabric treatment composition may comprise, based on total fabric treatment composition weight, form about 0.01 to about 10% of such particle.

Aspects of the invention include the use of the particles of the present invention in laundry detergent compositions (e.g., TIDE™), hard surface cleaners (e.g., MR CLEAN™) automatic dishwashing liquids (e.g., CASCADE™), dishwashing liquids (e.g., DAWN™), and floor cleaners (e.g., SWIFFER™). Non-limiting examples of cleaning compositions may include those described in U.S. Pat. Nos. 4,515,705; 4,537,706; 4,537,707; 4,550,862; 4,561,998; 4,597,898; 4,968,451; 5,565,145; 5,929,022; 6,294,514; and 6,376,445. The cleaning compositions disclosed herein are typically formulated such that, during use in aqueous cleaning operations, the wash water will have a pH of between about 6.5 and about 12, or between about 7.5 and 10.5. Liquid dishwashing product formulations typically have a pH between about 6.8 and about 9.0. Cleaning products are typically formulated to have a pH of from about 7 to about 12. Techniques for controlling pH at recommended usage levels include the use of buffers, alkalis, acids, etc., and are well known to those skilled in the art.

Fabric treatment compositions disclosed herein may comprise a consumer adjunct material such as a fabric softening active ("FSA"). Suitable fabric softening actives, include, but are not limited to, materials selected from the group consisting of quats, amines, fatty esters, sucrose esters, silicones, dispersible polyolefins, clays, polysaccharides, fatty oils, polymer latexes and mixtures thereof.

Consumer Product Adjunct Materials

While not essential for the purposes of the present invention, the non-limiting list of adjuncts illustrated hereinafter are suitable for use in the instant compositions and may be desirably incorporated in certain embodiments of the invention, for example to assist or enhance performance, for treatment of the substrate to be cleaned, or to modify the aesthetics of the composition as is the case with perfumes, colorants, dyes or the like. It is understood that such adjuncts are in addition to the components that are supplied via Applicants' delivery particles and FSAs. The precise nature of these additional components, and levels of incorporation thereof, will depend on the physical form of the composition and the nature of the operation for which it is to be used. Suitable adjunct materials include, but are not limited to, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids, solvents and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the adjunct ingredients are not essential to Applicants' cleaning and fabric care compositions. Thus, certain embodiments of Applicants' compositions do not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants—The compositions according to the present invention can comprise a surfactant or surfactant system wherein the surfactant can be selected from nonionic and/or anionic and/or cationic surfactants and/or ampholytic and/or zwitterionic and/or semi-polar nonionic surfactants. The surfactant is typically present at a level of from about 0.1%, from about 1%, or even from about 5% by weight of the cleaning compositions to about 99.9%, to about 80%, to about 35%, or even to about 30% by weight of the cleaning compositions.

Builders—The compositions of the present invention can comprise one or more detergent builders or builder systems. When present, the compositions may comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds. ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Catalytic Metal Complexes—Applicants' compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methyl-enephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936 and 5,595,967. Such cobalt catalysts are readily prepared by known procedures, such as taught for example in U.S. Pat. Nos. 5,597,936, and 5,595,967.

Compositions herein may also suitably include a transition metal complex of a macropolycyclic rigid ligand—abbreviated as "MRL". As a practical matter, and not by way of limitation, the compositions and cleaning processes herein can be adjusted to provide on the order of at least one part per hundred million of the benefit agent MRL species in the aqueous washing medium, and may provide from about 0.005 ppm to about 25 ppm, from about 0.05 ppm to about 10 ppm, or even from about 0.1 ppm to about 5 ppm, of the MRL in the wash liquor.

Preferred transition-metals in the instant transition-metal bleach catalyst include manganese, iron and chromium. Preferred MRL's herein are a special type of ultra-rigid ligand that is cross-bridged such as 5,12-diethyl-1,5,8,12-tetraazabicyclo[6.6.2]hexa-decane.

Suitable transition metal MRLs are readily prepared by known procedures, such as taught for example in U.S. Pat. No. 6,225,464.

Solvents—Suitable solvents include water and other solvents such as lipophilic fluids. Examples of suitable lipophilic fluids include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally-friendly solvents and mixtures thereof.

Processes of Making Compositions

The compositions of the present invention can be formulated into any suitable form and prepared by any process chosen by the formulator, non-limiting examples of which are described in U.S. Pat. No. 5,879,584; U.S. Pat. No. 5,691,297; U.S. Pat. No. 5,574,005; U.S. Pat. No. 5,569,645; U.S. Pat. No. 5,565,422; U.S. Pat. No. 5,516,448; U.S. Pat. No. 5,489,392; U.S. Pat. No. 5,486,303 all of which are incorporated herein by reference.

Method of Use

Compositions containing the benefit agent delivery particle disclosed herein can be used to clean or treat a situs inter alia a surface or fabric. Typically at least a portion of the situs is contacted with an embodiment of Applicants' composition, in neat form or diluted in a liquor, for example, a wash liquor and then the situs may be optionally washed and/or rinsed. In one aspect, a situs is optionally washed and/or rinsed, contacted with a particle according to the present invention or composition comprising said particle and then optionally washed and/or rinsed. For purposes of the present invention, washing includes but is not limited to, scrubbing, and mechanical agitation. The fabric may comprise most any fabric capable of being laundered or treated in normal consumer use conditions. Liquors that may comprise the disclosed compositions may have a pH of from about 3 to about 11.5. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1.

TEST METHODS

It is understood that the test methods that are disclosed in the Test Methods Section of the present application should be used to determine the respective values of the parameters of Applicants' invention as such invention is described and claimed herein.

(1) Fracture Strength
 a.) Place 1 gram of particles in 1 liter of distilled deionized (DI) water.
 b.) Permit the particles to remain in the DI water for 10 minutes and then recover the particles by filtration, using a 60 mL syringe filter, 1.2 micron nitrocellulose filter (Millipore, 25 mm diameter).
 c.) Determine the rupture force of 50 individual particles. The rupture force of a particle is determined using the procedure given in Zhang, Z.; Sun, G; "Mechanical Properties of Melamine-Formaldehyde microcapsules," J. Microencapsulation, Vol 18, No. 5, Pages 593-602, 2001. Then calculate the fracture strength of each particle by dividing the rupture force (in Newtons) by the cross-sectional area of the respective spherical particle ($\pi r^2$, where r is the radius of the particle before compression), said cross-sectional area being determined as follows: measuring the particle size of each individual particle using the experimental apparatus and method of Zhang, Z.; Sun, G; "Mechanical Properties of Melamine-Formaldehyde microcapsules," J. Microencapsulation, Vol 18, No. 5, Pages 593-602, 2001.
 d.) Use the 50 independent measurements from c.) above, and calculate the percentage of particles having a fracture strength within the claimed range fracture strength range.

(2) ClodP
The "calculated logP" (ClogP) is determined by the fragment approach of Hansch and Leo (cf., A. Leo, in Comprehensive Medicinal Chemistry, Vol. 4, C. Hansch, P. G. Sammens, J. B. Taylor, and C. A. Ramsden, Eds. P. 295, Pergamon Press, 1990, incorporated herein by reference). ClogP values may be calculated by using the "CLOGP" program available from Daylight Chemical Information Systems Inc. of Irvine, Calif. U.S.A.

(3) Boiling Point
Boiling point is measured by ASTM method D2887-04a, "Standard Test Method for Boiling Range Distribution of Petroleum Fractions by Gas Chromatography," ASTM International.

(4) Particle Size
 a.) Qualitative observation of narrow/broad particle size distribution evaluated by use of a microscope.
 b.) Quantitative analysis of particles conducted by using a Horiba light scattering instrument.

(5) Hansen Solubility Parameter
The total Hansen solubility parameter for a single component is calculated using the following equation $$\delta_t^2 = \delta_d^2 + \delta_p^2 + \delta_h^2$$

where: $\delta_t$ is the total Hansen parameter and $\delta_d$, is the dispersion component, $\delta_p$ is the polar component and $\delta_h$ is the h-bonding component. For purposes of the present application, the total Hansen solubility parameter is determined using the commercially available package called Molecular Modeling Pro supplied by ChemSW, 4771 Mangels Blvd, Fairfield, Calif. 94534. For multi-component compositions, for example a perfume oil, the total Hansen solubility parameter is calculated as follows.

$$\delta = \Phi_1 \delta_1 + \Phi_2 \delta_2 + \ldots + \Phi_i \delta_i$$

where $\delta_i$ is solubility parameter of $i^{th}$ substance and $\Phi_i$ is volume fraction of $i^{th}$ substance in the mixture.

(6) Benefit Agent Leakage
 a.) Obtain 2, one gram perfume equivalent samples of benefit agent particle composition.
 b.) Add 0.6 gram perfume equivalent (Sample 1) of particle composition to 99.4 grams of product matrix that the particle will be employed in. Shake the sample vial to disperse the particles on the product matrix.
 c.) Age the particle containing product matrix (Sample 1) of b.) above for 1 day, 2 weeks, and 4 weeks at 35° C. in a sealed, glass jar.
 d. Take out 1.0 g of this aged matrix, add 4 drops of 2-Ethyl-1,3-hexanediol (EHG) and 50 mL of deionised water and sonicate for 1 minute. Filter this mixture through 60 cc syringe using 1.2 micron cellulose nitrate membrane using membrane holder. Microcapsules get collected on the membrane. Take out membrane in 15 mL capped bottle and add 10 mL ethanol containing dodecane as an internal standard. Heat it at 60 C for 1 hour after which cool to room temperature, filter through 0.45 micron filter using 5 mL syringe. Filtered solution is then injected into a Gas Chromatograph (GC) for analysis.
 e. The amount of perfume retained in microcapsules is calculated and from the theoretical perfume content in microcapsule dispersion amount of perfume leaked out in the matrix during aging at specific time period is determined.

(7) Determination of % Solid Content Recovery. This test determines the quality of microcapsule wall, wall forming polymer conversion and encapsulation efficiency.
 a. Weighed membrane (1.2 μm) is made wet by putting it in water.
 b. Weighed quantity (0.15 to 0.2 g) of dispersion is taken in 50 mL beaker and 5 mL water is added, and this mixture is sonicated for 1 min. This diluted microcapsule dispersion is filtered through membrane by using filtration assembly.
 c. Microcapsules collected on membrane are kept in incubator at 35 C for 1 hr. after which membrane is allowed to attain the room temperature and weighed.

Weight of capsule=(weight of membrane+capsule)− weight of membrane

Obtained solid content=(measured weight of capsule/ weight of dispersion)×100

Solid content recovery=(measured solid content/Theoretical solid content)×100

(8) Measurement of Residual Isocyanate
Dibutyl Amine Titration Method:

10% DBA solution (prepared in dry toluene) is reacted with isophorone diisocyanate and excess DBA is titrated with 0.1N HCL solution using bromophenol blue as an indicator.

Weigh accurately 10 mL of isophorone diisocyanate solution in dry toluene (with known concentration) in 250 mL conical flask. Add 10 mL dry toluene and shake till clear solution is obtained. To this 10 mL di butyl amine (10%) reagent is added by pipette. Keep this mixture at room temperature for 20 minutes followed by addition of 25 mL methanol. Titrate this mixture with 0.1N HCL (taken in burette) using bromophenol blue indicator. End point is Blue to Yellow.

The same procedure is followed without isocyanate for blank titration.

% NCO=$(B1-B2) \times$ normality of HCL$\times 4.202$/wt. of sample (g)

B1=Burette reading (mL) with blank titration
B2=Burette reading (mL) with sample titration For residual NCO content in perfume capsules, perfume capsules are isolated as dry powder and then dissolved in dry Dimethyl formamide (DMF) solvent. This solution is then taken for further analysis.

EXAMPLES

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Perfume oil composition utilized in the making of benefit agent delivery particles of subsequent Examples:

| Material Name | % |
| --- | --- |
| Amyl Salicylate | 1 |
| Anisic Aldehyde | 5 |
| Benzyl Acetate | 6.5 |
| Cis 3 Hexenyl Acetate | 0.3 |
| Citronellol | 4 |
| Coumarin | 0.4 |
| Dihydro Myrcenol | 5 |
| Flor Acetate | 9 |
| Geraniol | 2 |
| Hexyl Cinnamic Aldehyde | 4 |
| Ionone Alpha | 1 |
| Ionone Gamma Methyl | 9 |
| Iso E Super Or Wood | 2 |
| Iso Eugenol | 1 |
| Linalool | 6 |
| Linalyl Acetate | 4 |
| Lyral | 3 |
| Methyl Dihydro Jasmonate | 8 |
| Orange Terpenes | 7 |
| Phenyl Ethyl Alcohol | 10 |
| Phenyl Ethyl Phenyl Acetate | 7.5 |
| Terpineol | 3.3 |
| Verdantiol | 1 |

Example 1

Microcapsules are prepared by following procedure so as to achieve 50% active loading based on total weight of polymer forming monomers and active. A solution is prepared by dissolving 4.4 g isophorone diisocyanate and 5.69 g perfume oil. The stabilizer solution is prepared by dissolving 5 g of poly(vinylpyrrolidone) K90 (PVP K 90) in 100 g of water. A mixture of 1.66 g ethylene diamine with 15 g of stabilizer solution and 0.04 g catalyst diaminobicyclooctane (DABCO) is prepared. 40 g of stabilizer solution is placed in a vessel having a volume of approximately 250 mL. The solution is brought to 27° C. and agitated using a turbine type stirrer at a speed of 1000 revolutions per minute. The solution of isocyanate and perfume oil is added. After 15 minutes when emulsion of required droplet size is formed, a mixture of ethylene diamine, stabilizer solution and catalyst is added drop-wise over a period of 6-7 minutes. After a period of 5 hours speed is reduced to 500 revolutions per minute. Thereafter by stirring the mixture for further 15 hours, the temperature of the mixture is increased to 50° C. After stirring the mixture at 50° C. for 2 hours, the temperature is lowered to 27° C. The obtained microcapsules have a particle size in the range of 5-50 microns of which a majority of particles are 10-40 microns and these microcapsules are stored as aqueous dispersion. Weight of this aqueous dispersion is 66 g. This dispersion contains 8.6% perfume oil.

Example 2

Microcapsules are prepared by following procedure so as to achieve 70% active loading based on total weight of polymer forming monomers and active. A solution is prepared by dissolving 4.4 g isophorone diisocyanate and 13.3 g perfume oil. The stabilizer solution is prepared by dissolving 5 g of poly(vinylpyrrolidone) K90 (PVP K 90) in 100 g of water. A mixture of 1.66 g ethylene diamine with 15 g of stabilizer solution and 0.04 g catalyst diaminobicyclooctane (DABCO) is prepared. 40 g of stabilizer solution is placed in a vessel having a volume of approximately 250 mL. The solution is brought to 27° C. and agitated using a turbine type stirrer at a speed of 1000 revolutions per minute. The solution of isocyanate and perfume oil is added. After 15 minutes when emulsion of required droplet size is formed, a mixture of ethylene diamine, stabilizer solution and catalyst is added drop-wise over a period of 7-8 minutes. After a period of 5 hours speed is reduced to 500 revolutions per minute. Thereafter by stirring the mixture for further 15 hours, the temperature of the mixture is increased to 50° C. After stirring the mixture at 50° C. for 2 hours, the temperature is lowered to 27° C. The obtained microcapsules have a particle size in the range of 2-35 microns of which a majority of particles are 5-30 microns and these microcapsules are stored as aqueous dispersion. Weight of this aqueous dispersion is 71 g. This dispersion contains 18.7% perfume oil.

Example 3

Microcapsules are prepared by following procedure so as to achieve 80% active loading based on total weight of polymer forming monomers and active. A solution is prepared by dissolving 4.7 g isophorone diisocyanate and 20.4 g perfume oil. A stabilizer solution is prepared by dissolving 20 g of ethylene maleic anhydride (EMA) copolymer in 980 g of water at 70° C., cooling the solution to 27° C. followed by adjusting pH of the solution to 7.0 by adding 50% w/w sodium hydroxide solution and then making the volume of solution to 1000 mL with water.

A mixture of 1.68 g ethylene diamine with 15 g of stabilizer solution and 0.04 g catalyst diaminobicyclooctane (DABCO) is prepared. 40 g of stabilizer solution is placed in a vessel having a volume of approximately 250 mL. The solution is brought to 27 C and agitated using a turbine type stirrer at a speed of 1000 revolutions per minute. The solution of isocyanate and perfume oil is added. After 15 minutes when emulsion of required droplet size is formed, a mixture of ethylene diamine, stabilizer solution and catalyst is added drop-wise over a period of 5-6 minutes. After a period of 5 hours speed is reduced to 500 revolutions per minute. Thereafter by stirring the mixture for further 15 hours, the temperature of the mixture is increased to 50° C. After stirring the mixture at 50° C. for 2 hours, the temperature is lowered to 27° C.

The obtained microcapsules have a particle size in the range of 2-40 microns of which a majority of particles are 10-35 microns and these microcapsules are stored as aqueous dispersion. Weight of this aqueous dispersion is 76 g. This dispersion contains 27% perfume oil.

Example 4

Microcapsules are prepared by following procedure so as to achieve 80% active loading based on total weight of polymer forming monomers and active. A solution is prepared by dissolving 3.2 g of toluene diisocyanate and 17 g perfume oil. A stabilizer solution is prepared by dissolving 20 g of ethylene maleic anhydride (EMA) copolymer in 980 g of water at 70° C., cooling the solution to 27° C. followed by adjusting pH of the solution to 7.0 by adding 50% w/w sodium hydroxide solution and then making the volume of solution to 1000 mL with water. A mixture of 1.66 g ethylene diamine with 15 g of stabilizer solution and 0.04 g catalyst diaminobicyclooctane (DABCO) is prepared. 40 g of stabilizer solution is placed in a vessel having a volume of approximately 250 mL. The solution is brought to 27° C. and agitated using a turbine type stirrer at a speed of 1000 revolutions per minute. The solution of isocyanate and perfume oil is added.

After 15 minutes when an emulsion of required droplet size is formed, a mixture of ethylene diamine, stabilizer solution and catalyst is added drop-wise over a period of 7-8 minutes. After a period of 5 hours speed is reduced to 500 revolutions per minute. Thereafter by stirring the mixture for further 15 hours, the temperature of the mixture is increased to 50° C. After stirring the mixture at 50° C. for 2 hours, the temperature is lowered to 27° C.

The obtained microcapsules have a particle size in the range of 2-40 microns of which a majority of particles are 5-35 microns and these microcapsules are stored as aqueous dispersion. Weight of this aqueous dispersion is 76 g. This dispersion contains 27% perfume oil.

Example 5

Microcapsules are prepared by following procedure so as to achieve 70% active loading based on total weight of polymer forming monomers and active. A solution is prepared by dissolving 3.8 g isophorone diisocyanate and 13.6 g perfume oil. The stabilizer solution is prepared by dissolving 5 g of poly(vinylpyrrolidone) K90 (PVP K 90) in 100 g of water. A mixture of 2.7 g of hexamethylene diamine with 15 g of stabilizer solution and 0.04 g catalyst diaminobicyclooctane (DABCO) is prepared. 40 g of stabilizer solution is placed in a vessel having a volume of approximately 250 mL. The solution is brought to 27° C. and agitated using a turbine type stirrer at a speed of 1000 revolutions per minute. The solution of isocyanate and perfume oil is added. After 15 minutes when emulsion of required droplet size is formed, a mixture of ethylene diamine, stabilizer solution and catalyst is added drop-wise over a period of 7-8 minutes. After a period of 5 hours speed is reduced to 500 revolutions per minute. Thereafter by stirring the mixture for further 15 hours, the temperature of the mixture is increased to 50° C. After stirring the mixture at 50° C. for 2 hours, the temperature is lowered to 27° C.

The obtained microcapsules have a particle size in the range of 2-50 microns of which a majority of particles are 5-35 microns and these microcapsules are stored as aqueous dispersion. Weight of this aqueous dispersion is 62 g. This dispersion contains 22% perfume oil.

Example 6

Into a mixture of 89.5 grams of water, 5 grams of urea, 0.5 gram of resorcinol and 5 grams of an alkyl acrylate-acrylic acid copolymer, adjusted to pH 4.0, are emulsified 90 grams of perfume oil. These mixtures are emulsified and the resulting mixture is placed in a container which is mounted in a room temperature water bath, continuous stirring is provided, 13.5 grams of 37% formaldehyde solution are added and the bath is heated to 55.° C. and maintained at that temperature overnight to initiate and complete encapsulation.

Example 7

1200 g of perfume microcapsule slurry, containing one or more of the variants of microcapsules disclosed in the present specification, is mixed together with 700 g of water for 10 minutes using an IKA Eurostar mixer with R1382 attachment at a speed of 180 rpm. The mixture is then transferred over to a feeding vessel to be spray dried in a 1.2 m diameter Niro Production Minor. The slurry is fed into the tower using a Watson-Marlow 504U peristaltic pump and atomised using a 100 mm diameter rotary atomiser run at 18000 rpm, with co-current air flow for drying. The slurry is dried using an inlet temperature of 200° C. and outlet temperature of 95° C. to form a fine powder. The equipment used the spray drying process may be obtained from the following suppliers: IKA Werke GmbH & Co. KG, Janke and Kunkel—Str. 10, D79219 Staufen, Germany; Niro A/S Gladsaxevej 305, P.O. Box 45, 2860 Soeborg, Denmark and Watson-Marlow Bredel Pumps Limited, Falmouth, Cornwall, TR11 4RU, England.

Example 8

Microcapsules are prepared by following procedure so as to achieve 50% active loading based on total weight of polymer forming monomers and active. A solution is prepared by dissolving 8.8 g isophorone diisocyanate and 11.4 g perfume oil. The stabilizer solution is prepared by dissolving 10 g of poly(vinylpyrrolidone) K90 (PVP K 90) in 200 g of water. A mixture of 3.3 g ethylene diamine with 30 g of stabilizer solution and 0.08 g catalyst diaminobicyclooctane (DABCO) is prepared. 80 g of stabilizer solution is placed in a vessel having a volume of approximately 500 mL. The solution is brought to 27° C. and agitated using a turbine type stirrer at a speed of 1000 revolutions per minute. The solution of isocyanate and perfume oil is added. After 15 minutes when emulsion of required droplet size is formed, a mixture of ethylene diamine, stabilizer solution and catalyst is added drop-wise over a period of 7-8 minutes. After a period of 5 hours speed is reduced to 500 revolutions per minute. Thereafter by stirring the mixture for further 15 hours, the temperature of the mixture is increased to 50° C. After stirring the mixture at 50° C. for 2 hours, the temperature is lowered to 27° C. The obtained microcapsules have a particle size in the range of 5-50 microns of which a majority of particles are 10-40 microns and these microcapsules are stored as aqueous dispersion. Weight of this aqueous dispersion is 96 g. This dispersion contains 12% perfume oil.

Example 9

77 g of aqueous dispersion of microcapsules obtained from Example 8 is taken. Polyvinylpyrrolidone (PVP-K90) is removed from this microcapsule dispersion by centrifugation and washing with distilled water 2-3 times. Decanted layer (along with washed layer) after centrifugation is stored separately and weighed. Microcapsule paste from centrifuge tube is transfer in separate container and tube is washed with water. Thus aqueous dispersion of microcapsules after removal of PVP is obtained. Weight of this dispersion is 29 g. This dispersion contains 32% perfume oil.

Example 10

Microcapsules having carboxyl groups on the surface are prepared by following procedure so as to achieve 80% active loading based on total weight of polymer forming monomers and active. A prepolymer solution is prepared by dissolving 3.0 g poly tetramethylene glycol (PTMG 1000) and 0.22 g of dimethylol butanoic acid (DMBA) at 60° C. for 10-15 minutes with 1.04 g of toluene diisocyanate. A solution of prepolymer and 17.6 g of perfume oil is prepared by adding perfume oil to prepolymer, heating at 65° C. for 15 minutes and then cooling to 27° C.

A surfactant solution is prepared by dissolving 1 g of polyvinylalcohol (PVA) in 100 g of water. A mixture of 0.6 g ethylene diamine with 10.9 g of 5% poly(vinylpyrrolidone) K90 stabilizer aqueous solution and 0.04 g catalyst diaminobicyclooctane (DABCO) is prepared. 30.0 g of PVA solution is placed in a vessel having a volume of approximately 250 mL. The solution is brought to 27° C. and agitated using a turbine type stirrer at a speed of 1000 revolutions per minute. The solution of prepolymer and perfume oil is added. After 15 minutes when emulsion of required droplet size is formed, a mixture of ethylene diamine, stabilizer solution and catalyst is added drop-wise over a period of 10-12 minutes. After a period of 5 hours speed is reduced to 500 revolutions per minute. Thereafter by stirring the mixture for further 15 hours, the temperature of the mixture is increased to 50° C. After stirring the mixture at 50° C. for 2 hours, the temperature is lowered to 27° C. The obtained microcapsules have a particle size in the range of 2-25 microns of which a majority of particles are 5-20 microns and these microcapsules are stored as aqueous dispersion. Weight of this aqueous dispersion is 74 g. This dispersion contains 24% perfume oil.

Example 11

Microcapsules containing mixture of model actives are prepared by following procedure so as to achieve 33% total active loading based on total weight of polymer forming monomers and active. A solution is prepared by dissolving 0.05 g diaminobicyclooctane (DABCO as a catalyst) in 2 g of ethylene glycol. A stabilizer solution is prepared by dissolving 5 g of poly(vinylpyrrolidone) K30 (PVP) in 100 mL of water. A core material is obtained by mixing model actives namely anisaldehyde and benzophenone in 43:57 weight ratio. A mixture of 4.25 g of core material 6.59 g toluene diisocyanate is prepared. 100 mL of stabilizer solution is placed in a vessel having a volume of approximately 250 mL. The solution is brought to 27° C. and agitated using a turbine type stirrer at a speed of 1000 revolutions per minute. The solution of ethylene glycol and catalyst is added. A mixture of core material and toluene diisocyanate is added drop-wise over a period of 13-15 minutes. After a period of 6 hours speed is reduced to 400 revolutions per minute. Thereafter by stirring the mixture for further 15 hours, the temperature of the reaction mixture is increased to 60° C. After stirring the mixture at 60° C. for 1 hour, the temperature is lowered to 27° C. Obtained microcapsules are washed with water, filtered and dried in vacuum oven at 30° C. The yield of the product is 8.5 g. Obtained product is in the form of free flowing powder consisting of spherical microcapsules which have particle size in the range of 5-50 microns of which a majority of particles are 10-40 microns

TABLE

Solid Content Recovery (SCR) and benefit agent leakage stability,

| Microcapsules | SCR % | % Leakage In LFE after | | | % Leakage In HDL after | | |
| --- | --- | --- | --- | --- | --- | --- | --- |
| | | 1 Day | 2 Wks | 4 Wks | 1 Day | 2 Wks | 4 Wks |
| Example 1 | 78 | 25 | 44 | 57 | 11 | 26 | 37 |
| Example 2 | 78 | 43 | 67 | 76 | 47 | 36 | 45 |
| Example 3 | 74 | 90 | — | — | 90 | — | — |
| Example 4 | 47 | — | — | — | — | — | — |
| Example 5 | 79 | 50 | 61 | 65 | 50 | 64 | 73 |
| Example 8 | 83 | 29 | 63 | 70 | 21 | 34 | 40 |
| Example 9 | 97 | 22 | 34 | 55 | 31 | 27 | 53 |

Matrix used: 1) Liquid Fabric Enhancer (LFE) 2) High Duty Liquid detergent (HDL)

The fracture strength of capsules presented in the above table ranged from 1.5-6 MPa.

Example 12

Non-limiting examples of product formulations containing microcapsules summarized in the following table.

| (% wt) | EXAMPLES | | | | | | | | | |
|---|---|---|---|---|---|---|---|---|---|---|
| | A | B | C | D | E | F | G | H | I | J |
| FSA [a] | 14 | 16.47 | 14 | 12 | 12 | 16.47 | — | — | 5 | 5 |
| FSA [b] | — | — | — | — | — | — | 3.00 | — | — | — |
| FSA [c] | — | — | — | — | — | — | — | 6.5 | — | — |
| Ethanol | 2.18 | 2.57 | 2.18 | 1.95 | 1.95 | 2.57 | — | — | 0.81 | 0.81 |
| Isopropyl Alcohol | — | — | — | — | — | — | 0.33 | 1.22 | — | — |
| Starch [d] | 1.25 | 1.47 | 2.00 | 1.25 | — | 2.30 | 0.5 | 0.70 | 0.71 | 0.42 |
| Microcapsule (% active) * | 0.6 | 0.75 | 0.6 | 0.75 | 0.37 | 0.60 | 0.37 | 0.6 | 0.37 | 0.37 |
| Phase Stabilizing Polymer [f] | 0.21 | 0.25 | 0.21 | 0.21 | 0.14 | — | — | 0.14 | — | — |
| Suds Suppressor [g] | — | — | — | — | — | — | — | 0.1 | — | — |
| Calcium Chloride | 0.15 | 0.176 | 0.15 | 0.15 | 0.30 | 0.176 | — | 0.1-0.15 | — | — |
| DTPA [h] | 0.017 | 0.017 | 0.017 | 0.017 | 0.007 | 0.007 | 0.20 | — | 0.002 | 0.002 |
| Preservative (ppm) [i,j] | 5 | 5 | 5 | 5 | 5 | 5 | — | 250[j] | 5 | 5 |
| Antifoam [k] | 0.015 | 0.018 | 0.015 | 0.015 | 0.015 | 0.015 | — | — | 0.015 | 0.015 |
| Dye (ppm) | 40 | 40 | 40 | 40 | 40 | 40 | 11 | 30-300 | 30 | 30 |
| Ammonium Chloride | 0.100 | 0.118 | 0.100 | 0.100 | 0.115 | 0.115 | — | — | — | — |
| HCl | 0.012 | 0.014 | 0.012 | 0.012 | 0.028 | 0.028 | 0.016 | 0.025 | 0.011 | 0.011 |
| Structurant [l] | 0.01 | 0.01 | 0.01 | 0.01 | 0.01 | 0.01 | 0.01 | 0.01 | 0.01 | 0.01 |
| Neat Unencapsulated Perfume | 0.8 | 0.7 | 0.9 | 0.5 | 1.2 | 0.5 | 1.1 | 0.6 | 1.0 | 0.9 |
| Deionized Water | Balance | Balance | Balance | Balance | Balance | Balance | Balance | Balance | Balance | Balance |

[a] N,N-di(tallowoyloxyethyl)-N,N-dimethylammonium chloride.
[b] Methyl bis(tallow amidoethyl)2-hydroxyethyl ammonium methyl sulfate.
[c] Reaction product of Fatty acid with Methyldiethanolamine in a molar ratio 1.5:1, quaternized with Methylchloride, resulting in a 1:1 molar mixture of N,N-bis(stearoyl-oxy-ethyl) N,N-dimethyl ammonium chloride and N-(stearoyl-oxy-ethyl) N,-hydroxyethyl N,N dimethyl ammonium chloride.
[d] Cationic high amylose maize starch available from National Starch under the trade name CATO ®.
[f] Copolymer of ethylene oxide and terephthalate having the formula described in U.S. Pat. No. 5,574,179 at col. 15, lines 1-5, wherein each X is methyl, each n is 40, u is 4, each R1 is essentially 1,4-phenylene moieties, each R2 is essentially ethylene, 1,2-propylene moieties, or mixtures thereof.
[g] SE39 from Wacker
[h] Diethylenetriaminepentaacetic acid.
[i] KATHON ® CG available from Rohm and Haas Co. "PPM" is "parts per million."
[j] Gluteraldehyde
[k] Silicone antifoam agent available from Dow Corning Corp. under the tradename DC2310.
[l] Hydrophobically-modified ethoxylated urethane available from Rohm and Haas under the tradename Aculan 44.
* Suitable combinations of the microcapsules provided in Examples 1 through 11. (Percent active relates to the core content of the microcapsule.)

Example 13

Microcapsules in Dry Laundry Formulations

| | % w/w granular laundry detergent composition | | | | | | |
|---|---|---|---|---|---|---|---|
| Component | A | B | C | D | E | F | G |
| Brightener | 0.1 | 0.1 | 0.1 | 0.2 | 0.1 | 0.2 | 0.1 |
| Soap | 0.6 | 0.6 | 0.6 | 0.6 | 0.6 | 0.6 | 0.6 |
| Ethylenediamine disuccinic acid | 0.1 | 0.1 | 0.1 | 0.1 | 0.1 | 0.1 | 0.1 |
| Acrylate/maleate copolymer | 1.5 | 1.5 | 1.5 | 1.5 | 1.5 | 1.5 | 1.5 |
| Hydroxyethane di(methylene phosphonic acid) | 0.4 | 0.4 | 0.4 | 0.4 | 0.4 | 0.4 | 0.4 |
| Mono-$C_{12-14}$ alkyl, di-methyl, mono-hydroyethyl quaternary ammonium chloride | 0.5 | 0.5 | 0.5 | 0.5 | 0.5 | 0.5 | 0.5 |
| Linear alkyl benzene | 0.1 | 0.1 | 0.2 | 0.1 | 0.1 | 0.2 | 0.1 |
| Linear alkyl benzene sulphonate | 10.3 | 10.1 | 19.9 | 14.7 | 10.3 | 17 | 10.5 |
| Magnesium sulphate | 0.4 | 0.4 | 0.4 | 0.4 | 0.4 | 0.4 | 0.4 |
| Sodium carbonate | 19.5 | 19.2 | 10.1 | 18.5 | 29.9 | 10.1 | 16.8 |
| Sodium sulphate | 29.6 | 29.8 | 38.8 | 15.1 | 24.4 | 19.7 | 19.1 |
| Sodium Chloride | 0.1 | 0.1 | 0.1 | 0.1 | 0.1 | 0.1 | 0.1 |
| Zeolite | 9.6 | 9.4 | 8.1 | 18 | 10 | 13.2 | 17.3 |
| Photobleach particle | 0.1 | 0.1 | 0.2 | 0.1 | 0.2 | 0.1 | 0.2 |
| Blue and red carbonate speckles | 1.8 | 1.8 | 1.8 | 1.8 | 1.8 | 1.8 | 1.8 |

-continued

| Component | % w/w granular laundry detergent composition | | | | | | |
|---|---|---|---|---|---|---|---|
| | A | B | C | D | E | F | G |
| Ethoxylated Alcohol AE7 | 1 | 1 | 1 | 1 | 1 | 1 | 1 |
| Tetraacetyl ethylene diamine agglomerate (92 wt % active) | 0.9 | 0.9 | 0.9 | 0.9 | 0.9 | 0.9 | 0.9 |
| Citric acid | 1.4 | 1.4 | 1.4 | 1.4 | 1.4 | 1.4 | 1.4 |
| PDMS/clay agglomerates (9.5% wt % active PDMS) | 10.5 | 10.3 | 5 | 15 | 5.1 | 7.3 | 10.2 |
| Polyethylene oxide | 0.2 | 0.2 | 0.2 | 0.2 | 0.2 | 0.2 | 0.2 |
| Enzymes e.g. Protease (84 mg/g active), Amylase (22 mg/g active) | 0.2 | 0.3 | 0.2 | 0.1 | 0.2 | 0.1 | 0.2 |
| Suds suppressor agglomerate (12.4 wt % active) | 0.2 | 0.2 | 0.2 | 0.2 | 0.2 | 0.2 | 0.2 |
| Sodium percarbonate (having from 12% to 15% active AvOx) | 7.2 | 7.1 | 4.9 | 5.4 | 6.9 | 19.3 | 13.1 |
| Perfume oil | 0.5 | 0.5 | 0.5 | 0.5 | 0.5 | 0.5 | 0.5 |
| Solid perfume particles | 0.4 | 0 | 0.4 | 0.4 | 0.4 | 0.4 | 0.6 |
| Perfume microcapsules* | 1.3 | 2.4 | 1 | 1.3 | 1.3 | 1.3 | 0.7 |
| Water | 1.4 | 1.4 | 1.4 | 1.4 | 1.4 | 1.4 | 1.4 |
| Misc | 0.1 | 0.1 | 0.1 | 0.1 | 0.1 | 0.1 | 0.1 |
| Total Parts | 100 | 100 | 100 | 100 | 100 | 100 | 100 |

*Microcapsule added as 35% active slurry. Core/wall ratio can range from 40/60 up to 90/10 and average particle diameter can range from 5 μm to 50 μm

Example 14

Liquid Laundry Formulations (HDLs)

| Ingredient | HDL 1 | HDL 2 | HDL 3 | HDL 4 | HDL 5 | HDL 6 |
|---|---|---|---|---|---|---|
| Alkyl Ether Sulphate | 0.00 | 0.50 | 12.0 | 12.0 | 6.0 | 7.0 |
| Dodecyl Benzene Sulphonic Acid | 8.0 | 8.0 | 1.0 | 1.0 | 2.0 | 3.0 |
| Ethoxylated Alcohol | 8.0 | 6.0 | 5.0 | 7.0 | 5.0 | 3.0 |
| Citric Acid | 5.0 | 3.0 | 3.0 | 5.0 | 2.0 | 3.0 |
| Fatty Acid | 3.0 | 5.0 | 5.0 | 3.0 | 6.0 | 5.0 |
| Ethoxysulfated hexamethylene diamine quaternized | 1.9 | 1.2 | 1.5 | 2.0 | 1.0 | 1.0 |
| Diethylene triamine penta methylene phosphonic acid | 0.3 | 0.2 | 0.2 | 0.3 | 0.1 | 0.2 |
| Enzymes | 1.20 | 0.80 | 0 | 1.2 | 0 | 0.8 |
| Brightener (disulphonated diamino stilbene based FWA) | 0.14 | 0.09 | 0 | 0.14 | 0.01 | 0.09 |
| Cationic hydroxyethyl cellulose | 0 | 0 | 0.10 | 0 | 0.200 | 0.30 |
| Poly(acrylamide-co-diallyldimethylammonium chloride) | 0 | 0 | 0 | 0.50 | 0.10 | 0 |
| Hydrogenated Castor Oil Structurant | 0.50 | 0.44 | 0.2 | 0.2 | 0.3 | 0.3 |
| Boric acid | 2.4 | 1.5 | 1.0 | 2.4 | 1.0 | 1.5 |
| Ethanol | 0.50 | 1.0 | 2.0 | 2.0 | 1.0 | 1.0 |
| 1,2 propanediol | 2.0 | 3.0 | 1.0 | 1.0 | 0.01 | 0.01 |
| Glutaraldehyde | 0 | 0 | 19 ppm | 0 | 13 ppm | 0 |
| Diethyleneglycol (DEG) | 1.6 | 0 | 0 | 0 | 0 | 0 |
| 2,3-Methyl-1,3-propanediol (M pdiol) | 1.0 | 1.0 | 0 | 0 | 0 | 0 |
| Mono Ethanol Amine | 1.0 | 0.5 | 0 | 0 | 0 | 0 |
| NaOH Sufficient To Provide Formulation pH of: | pH 8 | pH 8 | pH 8 | pH 8 | pH 8 | pH 8 |
| Sodium Cumene Sulphonate (NaCS) | 2.00 | 0 | 0 | 0 | 0 | 0 |
| Silicone (PDMS) emulsion | 0.003 | 0.003 | 0.003 | 0.003 | 0.003 | 0.003 |
| Perfume | 0.7 | 0.5 | 0.8 | 0.8 | 0.6 | 0.6 |
| Polyethyleneimine | 0.01 | 0.10 | 0.00 | 0.10 | 0.20 | 0.05 |
| Perfume Microcapsules* | 1.00 | 5.00 | 1.00 | 2.00 | 0.10 | 0.80 |
| Water | Balance | Balance | Balance | Balance | Balance | Balance |

*Perfume Microcapsules Slurry in accordance with the teaching of the present specification.

Example 15

| Examples of liquid detergents | A | B ** | C |
|---|---|---|---|
| C14-C15 alkyl poly ethoxylate (8) | 3.7 | | 20.7 |
| C12-C14 alkyl poly ethoxylate (7) | | 16.7 | |
| C12-C14 alkyl poly ethoxylate (3) sulfate Na salt | 17.8 | | 5.5 |
| Linear Alkylbenzene sulfonate acid | 12.5 | 22.9 | 13.5 |
| Citric Acid | 3.9 | | 1.7 |
| C12-C18 Fatty Acid | 11.1 | 18 | 5.1 |
| Enzymes | 3 | 1.2 | 3 |
| Boric Acid | 0.5 | | 0.5 |
| Trans-sulphated ethoxylated hexamethylene diamine quat | 3.25 | | 1.2 |
| PEI 600 EO20 | 1.25 | | 1.2 |
| Diethylene triamine penta methylene phosphonic acid or HEDP | 1.6 | | 0.85 |
| Fluorescent brightener | 0.2 | 0.3 | 0.14 |
| Hydrogenated Castor Oil | | 0.2 | |
| 1, 2 propanediol | 4.3 | 20.3 | 11.7 |
| Sodium hydroxide | | 1.0 | 3.9 |
| Mono Ethanol Amine | 9.8 | 6.8 | 3.1 |
| Dye | Present | Present | Present |
| PDMS | | 2.15 | |
| Potassium sulphite | | 0.2 | |
| Perfume micro capsules (expressed as perfume oil) | 1.6 | 1.5 | 1.4 |
| Perfume | 1.2 | 1.6 | 1.0 |
| Form. Phenyl Boronic Acid | | | Present |
| Water | Up to 100 | Up to 100 | Up to 100 |

** Low water liquid detergent in Polyvinylalcohol unidose/sachet

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. Benefit agent delivery particles comprising a core, said core comprising, based on total core weight, at least 70% of one or more benefit agents having a ClogP of greater than 0 but less than about 3.5 and a shell, said shell at least partially surrounding said core material said wherein said shell is a reaction product from a reaction comprising a first shell material and a second shell material; wherein said first shell material is an aliphatic polyisocyanate; wherein at least one benefit agent comprises one or more perfume oils.

2. Benefit agent delivery particles according to claim 1, said benefit agent delivery particle's having a shell material weight, based on the total benefit agent delivery particle weight, of from about 20% to 60%.

3. Benefit agent delivery particles according to claim 2, at least 75% of said benefit agent delivery particles having a fracture strength of from about 0.2 MPa to about 10 MPa.

4. Benefit agent delivery particles according to claim 1, wherein said one or more benefit agents comprise a material selected from the group consisting of a flavor oil, a vegetable oil, an esters of a vegetable oil, an aromatic solvent, a silicone oil, and mixtures thereof.

5. Benefit agent delivery particles according to claim 1, said shell comprising, a material selected from the group consisting of a polycondensation reaction product, in one aspect said polycondensation reaction product is selected from the group consisting of a polyamide, a polycarbonate, a polyester, a polyurethane, a polyurea and mixtures thereof.

6. Benefit agent delivery particles according to claim 5, wherein said polycondensation reaction product comprises a polyurethane-polyurea comprising, based on total polyurethane-polyurea weight from about 0.5% to about 3.0% pendant carboxylic moieties.

7. Benefit agent delivery particles according to claim 5, having a shell material weight, based on the total benefit agent delivery particle weight, of from about 20% to 60%.

8. Benefit agent delivery particles according to claim 7, at least 75% of said benefit agent delivery particles have a fracture strength of from about 0.2 MPa to about 10 MPa.

9. Benefit agent delivery particles according to claim 1, said benefit agent delivery particles comprising less that about 50 ppm formaldehyde and less that about 50 ppm isocyanate.

10. The benefit delivery particles of claim 1, wherein said benefit delivery particles have a fracture strength from 1.5 MPa to 6 MPa.

11. A process of making benefit agent delivery particles, the process comprising:
producing benefit agent delivery particles comprising a core, said core comprising, based on total core weight, at least 70% of one or more benefit agents having a ClogP of greater than 0 but less than about 3.5 and a shell, said shell at least partially surrounding said core material; wherein said core and said shell have a solubility parameter difference of from about 1 to about 20; wherein at least one benefit agent comprises one or more perfume oils.

12. The process of claim 11, further comprising producing said benefit agent delivery particles by interfacially polymerizing said shell material.

13. The process of claim 11, wherein at least 75% of said benefit agent delivery particles have a shell material weight, based on the total benefit agent delivery particle weight, of from about 20% to 60%.

14. The process of claim 11, wherein at least 75% of said benefit agent delivery particles have a fracture strength of from about 0.2 MPa to about 10 MPa.

15. A consumer product comprising:
an adjunct material; and
a plurality of benefit agent delivery particles comprising a core, said core comprising, based on total core weight, at least 70% of one or more benefit agents having a ClogP of greater than 0 but less than about 3.5 and a shell, said shell at least partially surrounding said core material wherein said shell is a reaction product from a reaction comprising a first shell material and a second shell material; wherein said first shell material is an aliphatic polyisocyanate; wherein at least one benefit agent comprises one or more perfume oils.

16. The consumer product of claim 15, wherein said one or more benefit agents comprise a material selected from the group consisting of a flavor oil, a vegetable oil, an esters of a vegetable oil, an aromatic solvent, a silicone oil, and mixtures thereof.

17. The consumer product of claim 15, wherein said shell comprises a polycondensation reaction product selected from the group consisting of a polyamide, a polycarbonate, a polyester, a polyurethane, a polyurea, and mixtures thereof.

18. The consumer product of claim 17, wherein said polycondensation reaction product comprises a polyurethane-polyurea comprising, based on total polyurethane-polyurea weight, from about 0.5% to about 3.0% pendant carboxylic moieties.

19. The consumer product of claim 15, wherein said aliphatic polyisocyanate is selected from the group consisting of dicyclohexylmethane 4,4'-diisocyanate; hexamethylene 1,6-diisocyanate; isophorone diisocyanate; trimethyl-hexamethylene diisocyanate; trimer of hexamethylene1,6-diisocyanate; trimer of isophorone diisocyanate; 1,4-cyclohexane diisocyanate; urea of hexamethylene diisocyanate; trimethylene diisocyanate; propylene-1,2-diisocyanate; butylene1,2-diisocyanate; and mixtures thereof.

\* \* \* \* \*